United States Patent [19]

Harrington et al.

[11] 4,040,896

[45] Aug. 9, 1977

[54] CHEMICAL POLISH FOR BAF$_2$ AND CAF$_2$

[75] Inventors: James A. Harrington; Don A. Gregory, both of Huntsville, Ala.

[73] Assignee: The United States of America as represented by the Secretary of the Army, Washington, D.C.

[21] Appl. No.: 741,651

[22] Filed: Nov. 15, 1976

[51] Int. Cl.$^2$ .............................................. C23F 3/00
[52] U.S. Cl. ..................................... 156/645; 51/326; 156/903; 252/79.4
[58] Field of Search ............... 156/636, 639, 645, 903; 252/79.1, 79.2, 79.4; 51/281 R, 323, 326

[56] References Cited

U.S. PATENT DOCUMENTS

| | | | |
|---|---|---|---|
| 2,705,392 | 4/1955 | Imler | 156/645 X |
| 3,629,023 | 12/1971 | Strehlow | 156/639 |
| 3,808,065 | 4/1974 | Robinson et al. | 156/645 |

*Primary Examiner*—William A. Powell
*Attorney, Agent, or Firm*—Nathan Edelberg; Robert P. Gibson; Jack W. Voigt

[57] ABSTRACT

Disclosed are a method and the chemical solutions (a blend of H$_2$SO$_4$ and CH$_3$COOH) employed for producing high quality crystal surfaces on CaF$_2$ and BaF$_2$ by a chemical polishing cycle that follows a multistage mechanical polishing cycle. The high quality crystal surfaces on CaF$_2$ and BaF$_2$, which otherwise are of the quality for field of use, makes these crystals ideally suited for applications as windows for HF/DF laser since the chemically polished crystal surface has fewer irregularities which reduce the amount of surface scattering of the HF/DF radiation, thus allowing a more predictable output. The high quality surfaces achieved from chemical polishing are of particular value in the study of optical absorption of very low loss materials, where the scattered radiation produces heat.

3 Claims, 1 Drawing Figure

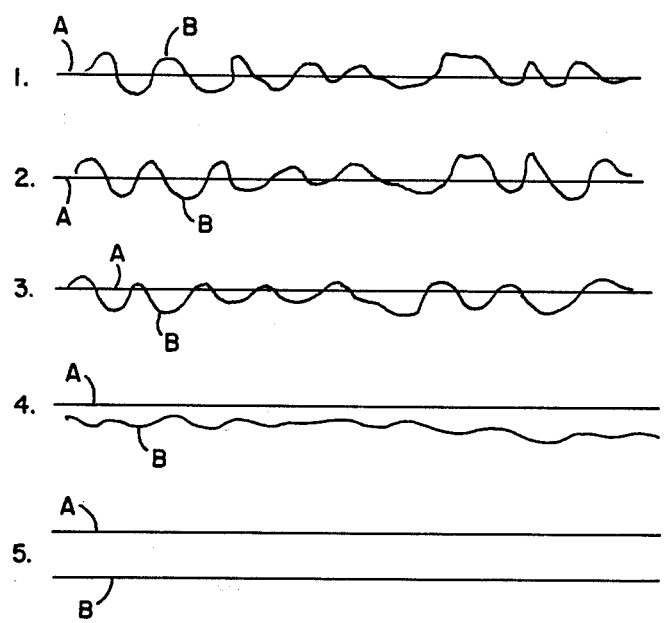

CHEMICAL POLISH FOR $BaF_2$ AND $CaF_2$

DEDICATORY CLAUSE

The invention described herein was made in the course of or under a contract or subcontract thereunder with the Government; therefore, the invention described herein may be manufactured, used and licensed by or for the Government for governmental purposes without the payment to us of any royalties thereon.

BACKGROUND OF THE INVENTION

In the past, detector crystal surfaces of chemical compounds have been hampered in quality of performance by cleavage steps which result when the chemical crystals are cleaved along the (III) crystallographic plane.

More recently the usefulness of chemical solutions to remove irregularities on crystal surfaces has been demonstrated by several investigators. Polishes have been developed for such materials as NaCl and KCl to produce high quality laser windows with little scattering. High quality, low scattering surfaces are also of interest in performing calorimetry measurements and determining absorption coefficients of various crystals.

The crystals $CaF_2$ and $BaF_2$ have been employed in radiation absorption measurements work. In order to render these crystals useful to the degree required, particularly, in laser radiation absorption measurement work, the crystal surface is required to be free of roughness and cleavage steps. When the crystal surface does not have the required smoothness absorption can occur which results in heating and failure of the crystal.

Therefore, an object of this invention is to provide a method to remove irregularities on crystal surfaces of $CaF_2$ and $BaF_2$.

Another object of this invention is to provide chemical polishes for removing irregularities on crystal surfaces of $CaF_2$ and $BaF_2$.

SUMMARY OF THE INVENTION

The method of this invention for producing high quality crystal surfaces on $CaF_2$ and $BaF_2$ includes using a multi-stage mechanical polishing cycle and a chemical polishing cycle. The multi-stage mechanical polishing cycle employs a coarse, intermediate, and fine grit size material to remove surface imperfection from the largest imperfections to the smallest visible scratches. The final polishing is accomplished by employing a mixed sulfuric acid and acetic acid solution in a chemical polishing cycle.

The multi-stage mechanical polishing cycle consists of first removing large imperfections with sandpaper, beginning with 240 grit and eventually ending with 600 grit. Next, polishing by a cloth (e.g. nylon) covered rotating wheel is accomplished by using a diamond polishing compound which ranges in grit size from about 1200 to about 100,000. The final mechanical polishing is also accomplished by a cloth (e.g. nylon) covered rotating wheel by using aluminum oxide of decreasing particle sizes of 5 micrometers, 0.5 micrometers, and 0.03 micrometers. After going through this series (more than once if needed) a surface can be produced that shows no visible scratches at 280 magnification. The crystal surface is cleaned with water, then dried. The chemical polishing cycle of this invention is employed to yield a high quality surface on the crystal that is useful in radiation measurements work.

The chemical polishing cycle of this invention uses a mixed sulfuric acid and acetic acid solution for a predetermined immersion period of time which does not exceed about 16 minutes per cycle for $CaF_2$ but can be extended to several hours per cycle for $BaF_2$. The preferred sulfuric acid to acetic acid parts ratio is about 4 to 9 for polishing the $BaF_2$ crystal surface and about 3 parts to 2 parts for polishing the $CaF_2$ crystal surface.

BRIEF DESCRIPTION OF THE DRAWING

The FIGURE consists of enlarged illustration 1–5 which illustrates the chemical polishing cycle of this invention in progress.

DESCRIPTION OF THE PREFERRED EMBODIMENT

It is essential that the quality of crystal surfaces employed as windows for lasers (HF/DF) be of high quality. Producing a surface with fewer irregularities would reduce the amount of surface scattering of the HF/DF radiation, thus allowing a more predictable output. Surfaces of the type described here are of particular value in the study of optical absorption of very low loss materials, where the scattered radiation produces heat.

The preferred embodiment of the method of this invention meets the quality standards set forth above by producing the desired crystal surface for $BaF_2$ and $CaF_2$ by employing a multi-stage mechanical polishing cycle and a chemical polishing cycle. The multi-stage mechanical polishing cycle is required to remove larger imperfections including deep scratches and even scratches which are visible under 280 magnification. If scratches are removed by only a chemical polishing cycle, the chemical polishing cycle would tend to etch the surface due to long exposure time which would be required; therefore, a first multi-stage mechanical polishing cycle is preferred for removing the larger imperfections and scratches.

The multi-stage mechanical polishing cycle includes employing grit of decreasing size to produce a relatively scratch free surface. First, sandpaper of decreasing coarseness (beginning with about 240 grit and eventually ending with about 600 grit) is used to remove larger imperfection. Next, an intermediate mechanical polish cycle using selected polishing compounds employing decreasing particle sizes (from about grit size 1200 to about 100,000) of diamond rouge is employed to prepare the crystal surface for the final mechanical polish cycle which employs a decreasing grit size of a polishing compound. The grit particle size range of the final polishing compound (aluminum oxide) includes the particle sizes of about 5 micrometers, 0.5 micrometers, and 0.03 micrometers for the final mechanical polishing cycle of this invention. After going through this series (more than once if needed) a surface can be produced that shows no visible scratches at 280 magnification.

After completion of the multi-stage mechanical polishing cycle the crystal is cleaned with water to remove any of the polishing compounds that might have been left on the surface. The crystal is then dried off using a purified compressed gas (or air) or blotted off with lens tissue. The crystal is now ready for the chemical polishing cycle.

The chemical polish for $BaF_2$ is prepared by slowing adding about 3.5 to 4.5 parts of concentrated sulfuric acid (95% $H_2SO_4$, S.G. 1.84) to about 8 to 10 parts of glacial acetic acid (99.7% acetic acid). The preferred ratio of $H_2SO_4$ to $CH_3COOH$ is 4/9.

The chemical polish for $CaF_2$ is prepared by slowing adding about 2.7 to 3.3 parts of concentrated sulfuric acid (95% $H_2SO_4$, S.G. 1.84) to about 1.8 to 2.2 parts of glacial acetic acid (99.7% acetic acid). The preferred ratio of $H_2SO_4$ to $CH_3COOH$ is 3/2.

The chemical polishing cycle begins by lowering the prepared crystal into the prepared solution with the polished sides of the crystal parallel to the container sides (i.e. with polished sides perpendicular to the surface of prepared solution) for varying periods of time depending on the mechanical polishing quality. The immersion time for $CaF_2$ is more critical than the immersion time for $BaF_2$ since an extended period of time for $CaF_2$ will produce an etch on the surface. As for $BaF_2$, times as long as several hours have been used with no evidence of etching. After each immersion time the crystal is rinsed with distilled water then dried with compressed purified air or blotted dry with lens paper. The immersion cycle can be repeated with immersion times for $CaF_2$ not to exceed approximately 16 minutes.

The drawing illustrates chemical polishing in progress. In the enlarged illustrations 1–5, A represents a reference line and B represents the crystal surface of $BaF_2$. The reference line A serves to illustrate how the irregularities of the crystal surface B are smoothed out during the chemical polishing cycle progress. The drawing illustrations depict what an extended number of photographs and slides revealed about the effectiveness of the chemical polishing cycle of this invention in eliminating irregularities on a crystal surface.

Variations in the chemical polish composition were tried in order to establish the preferred combination and concentration of chemical ingredients in the polish. The solutions:

$$\frac{H_2SO_4}{CH_3COOH} = 4/9 \text{ for } BaF_2 \text{ and } \frac{H_2SO_4}{CH_3COOH} = 3/2$$

for $CaF_2$ are the preferred embodiments; however, a deviation of the concentration of ± 10% can be tolerated. That is, the parts $H_2SO_4$ can vary from about 3.5 to 4.5 and the parts $CH_3COOH$ can vary from about 8 to about 10 parts for the $BaF_2$. The parts $H_2SO_4$ can vary from about 2.7 to about 3.3 and the parts $CH_3COOH$ can vary from about 1.8 to about 2.2 parts for the $CaF_2$. The immersion time on a like conditioned crystal surface can be adjusted to compensate for the specified weaker or stronger solution.

We claim:

1. A method for producing high quality, low scattering surfaces on a crystal selected from the crystals consisting of $BaF_2$ and $CaF_2$, said crystals when selected having surface irregularities and imperfections on the surface thereof that are removed by said method to yield crystals with polished surfaces as required for use as laser windows and for use in calorimetry measurements, said method comprising the completion of a multi-stage mechanical polishing cycle that is repeated as required for removing surface irregularities and polishing said surfaces which produces crystal surfaces with no visible scratches at 280 magnification and said method comprising the completion of a chemical polishing cycle that is repeated as required to produce said high quality, low scattering surfaces on said crystals; said multi-stage mechanical polishing cycle comprising:

i. removing large imperfections from said crystal surface with sandpaper, beginning with 240 grit and eventually ending with 600 grit;
   ii. polishing said crystal surface with a cloth covered rotating wheel using polishing compounds of decreasing particle size, said polishing compounds comprised substantially of diamond from grit size of about 1200 to about 100,000, said polishing beginning with about 1200 grit and eventually end with 100,000 grit which prepares said crystal surface for a final mechanical polishing cycle;
   iii. completing a final mechanical polishing cycle by further polishing said crystal surface that has been polished with said polishing compounds comprised substantially of a cloth covered rotating wheel using aluminum oxide having decreasing particle sizes of about 5 micrometers, 0.5 micrometers, and 0.03 micrometers, said final mechanical polishing cycle repeated as required to produce a crystal surface with no visible scratches at 280 magnification, said mechanical polishing cycle preparing said crystal surface for said chemical polishing cycle that follows cleaning and drying crystal surface;
   iv. cleaning said mechanically polished crystal surface with water to remove said polishing compound from said crystal surface;
   v. drying said polished and cleaned crystal surface which further prepares said crystal surface for said chemical polishing cycle; and completing said chemical polishing cycle which comprises:
   vi. lowering and positioning for a predetermined immersion time said mechanical polished, washed, and dried crystal surface into a container which contains a prepared polishing solution in sufficient amount for immersion of said crystal and comprised of from about 3.5 to about 4.5 parts of concentrated sulfuric acid mixed with from about 8 to about 10 parts of glacial acetic acid when said crystal selected is $BaF_2$ and said prepared solution comprised of from about 2.7 to about 3.3 parts of concentrated sulfuric acid mixed with from about 1.8 to about 2.2 parts of glacial acetic acid when said crystal selected is $CaF_2$, said lowering and positioning accomplished so that said mechanically polished, washed, and dried crystal surface has the polished sides perpendicular to the surface of said prepared solution, said predetermined immersion times being limited to approximately 16 minutes per immersion cycle for $CaF_2$ and to approximately several hours per immersion cycle for $BaF_2$, said predetermined immersion time per immersion cycle being based on an immersion time that will not etch the surfaces of said crystals;
   vii. removing said chemically polished crystal from said prepared polishing solution, rinsing said chemically polished crystal with distilled water, and then drying said chemically polished crystal to complete said chemical polishing cycle.

2. The method of claim 1 wherein said prepared polishing solution for said $BaF_2$ crystal is comprised of about 4 parts of concentrated sulfuric acid mixed with about 9 parts of glacial acetic acid.

3. The method of claim 1 wherein said prepared polishing solution for said $CaF_2$ crystal is comprised of about 3 parts of concentrated sulfuric acid mixed with about 2 parts of glacial acetic acid.

* * * * *